Figure 1:
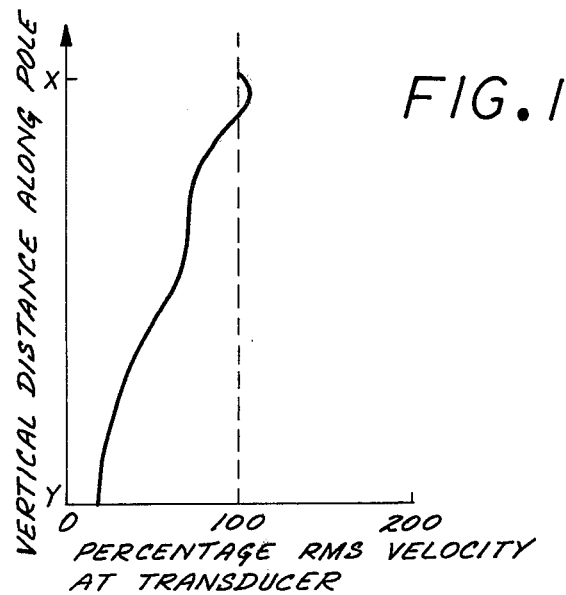

United States Patent [19]

Shaw

[11] 3,877,294

[45] Apr. 15, 1975

[54] VIBRATION TECHNIQUE FOR ROT DETECTION IN WOOD POLES AND TREES

[75] Inventor: Alan Douglas Shaw, Tasmania, Australia

[73] Assignee: The Fanner Manufacturing Company Pty. Limited, Victoria, Australia

[22] Filed: Mar. 14, 1973

[21] Appl. No.: 341,159

[30] Foreign Application Priority Data
Apr. 11, 1972 Australia............................ 8567/72

[52] U.S. Cl.................................. 73/67.2; 73/67.6
[51] Int. Cl........................................... G01n 29/04
[58] Field of Search............ 73/67, 67.2, 67.5, 67.6, 73/67.7, 67.8 R, 67.9, 71.5 US

[56] References Cited
UNITED STATES PATENTS

| | | | |
|---|---|---|---|
| 2,932,189 | 4/1960 | Carlin | 73/67.7 |
| 3,066,525 | 12/1962 | Harris | 73/67.5 R |
| 3,292,143 | 12/1966 | Russell | 181/.5 |
| 3,345,861 | 10/1967 | Heath | 73/67.2 |
| 3,521,483 | 7/1970 | Miller et al. | 73/67.5 R |
| 3,531,983 | 10/1970 | Heath et al. | 73/67.2 |
| 3,641,811 | 2/1972 | Gnaedinger et al. | 73/71.5 |
| 3,664,180 | 5/1972 | McDonald | 73/67.6 |

*Primary Examiner*—James J. Gill
*Attorney, Agent, or Firm*—Fulwider, Patton, Rieber, Lee & Utecht

[57] ABSTRACT

A method of detecting for the presence of decay in a wooden pole, and which involves subjecting the pole to a mechanical vibrational force at a frequency falling within the sonic frequency range, measuring the level of energy emerging from the pole at a number of axially spaced points along the length of the pole (the energy being measured in terms of R.M.S. velocity or acceleration of vibrations) and comparing the measurements of the emergent energy at the respective points.

8 Claims, 7 Drawing Figures

VIBRATION TECHNIQUE FOR ROT DETECTION IN WOOD POLES AND TREES

This invention relates to detection of decay in wooden poles and, in particular, to the detection of internal decay which would not normally be apparent from a visual inspection of the pole.

The invention is particularly appropriate (although not limited) to inspection of wooden poles which are employed to support electrical conductors. Such poles customarily have their lower end embedded within the ground and they are therefore susceptible to moisture induced internal decay at or near ground level.

Various method of detecting (or attempting to detect) the existance of decay in wooden poles have been devised, these including:

1. Aural interpretation of sound wave, this involving subjecting the poles to a sharp blow and listening for the "quality" of resultant sound emission from the pole.
2. Direct investigation, which involves cutting into a pole and making a visual and/or physical inspection of the pole core.
3. Sonic and ultra-sonic investigations, which involve applying a signal to a pole and either measuring the time taken for transmission of the signal from one point to another or detecting a change induced in the frequency of the signal as a result of non-homogeneous medium.
4. X-ray determination of the presence of decay.

Each of the abovementioned methods is known to possess certain inherent disadvantages. The aural interpretation process is characterised by its proven absence of reliability, and the direct investigation technique is known to diminish the quality of what might otherwise have been a "good" pole. Also, the sonic and ultra-sonic methods which are known to have been devised have proved inaccurate, particularly when the area of decay is small relative to the diameter of the tested pole, and the x-ray determination process in inherently expensive and time consuming.

Because of a prevailing uncertainty which is associated with most existing decay detecting methods, pole inspectors, particularly those who are engaged in electrical supply industry, tend to be very conservative in their assessment of the quality of a pole and poles which do in fact have a considerable remaining life are frequently condemned. This results in uneconomic usage of timber for pole construction.

The present invention seeks to provide a new method of detecting for the presence of decay in a wooden pole, the method comprising subjecting the pole to a mechanical vibrational force at a fixed (selected) point along the length of the pole, measuring emergent energy from the pole at a number of selected axially spaced points along the length of the pole, including at a point adjacent the point of application of vibrational force, and comparing the measurements of the emergent energy at the respective points.

The invention is predicated on an empirically determined fact that, the existence of an emergent energy level which increases to a significant extent with distance away from a point adjacent the point of applied energy is a positive indication of the presence of decay within the pole. Thus, the quality of a pole may be determined by comparing the emergent energy level differentials between the respective points of measurement, and a pole might be either accepted or rejected on the basis of the degree of difference in the energy levels.

Stated in another way, it has been empirically determined that an emergent energy level variation curve which is plotted against the measurement length of a pole and which is obtained from a good quality pole will be quite different from which is obtained from a partially decayed pole. Characteristic curves have been derived which respectively indicate good quality and partially decayed poles and, by obtaining an energy level reading which falls on or near one or other of such curves, an indication is derived as to the quality of the pole subject of a test.

This then means that each pole tested may be used as its own standard, it being assumed that at least a portion of the length of a tested pole is of sound quality, and the invention therefore eliminates the traditional problem posed by non-uniformity between the characteristics of various woods.

The assumption that a portion of a pole length is of sound quality would normally be valid in the case of, for example, an electrical conductor support pole which would generally be subjected to bacterial induced decay. at or near ground level. This being the case, the vibrator would normally be applied to the pole at a distance of about one meter above ground level and the emergent energy levels would be measured at spaced intervals below the point of vibrator application and to about 15 centimeters below ground level.

Measurement of emergent energy levels should be taken at points along a line diametrically opposite that of application of the vibrator.

A transducer which provides an output signal which is representative of the R.M.S. velocity or the acceleration of vibration is preferably employed (as a receiver) to obtain a measure of the emergent energy from the pole) the word "energy" as employed herein being used in the generic sense), and the output signal is preferably fed into a read-out device which will give a visual indication of the emergent energy. Then, after obtaining a reading from an upper (receiver) transducer, which may be assumed to be located adjacent an area of sound wood, readings would be taken from successively lower transducers and the respective recorded energy levels noted. If the energy leeel output at one or more of the lower points exceeds that obtained from the upper points by more than 50 percent, then the pole might be regarded as unsafe. However, the actual amount of increase which will be taken to indicate an unsafe pole will be dependent upon the function and requirements of the pole.

Vibrational energy emerging from a pole is preferably measured by holding or mounting the receiver transducer to metal spikes which are driven into the pole. A single transducer may be attached in turn to each spike or, alternatively, one transducer might be mounted to each spike and in circuit with the read-out device via a switching mechanism.

Vibrations are preferably applied to the pole at a frequency falling within the sonic frequency range.

The invention as above defined in broad terms is applicable to the detection of decay in wood poles which do not embody such discontinuities as radial cracks. In cases where cracks have been located in specimen poles it has been found that the application of vibrational energy at an arbitrary frequency may result in an energy variation curve which departs from the characteristic curves abovementioned. However, it has also been found that if a vibrational force having resonant-like characteristics is applied, the effects of cracks are mitigated against and energy variation curves which correspond approximately with the characteristic curves will be obtained.

Therefore, in accordance with a preferred form of the invention a mechanical vibrational force having a resonant frequency of oscillation is applied, to the pole, said resonant frequency being determined by adjusting the frequency of applied vibration to provide a maximum emergent energy level reading for any given wooden pole.

The invention will be more fully understood from the following description which is given with reference to the accompanying drawings.

Figure 3:
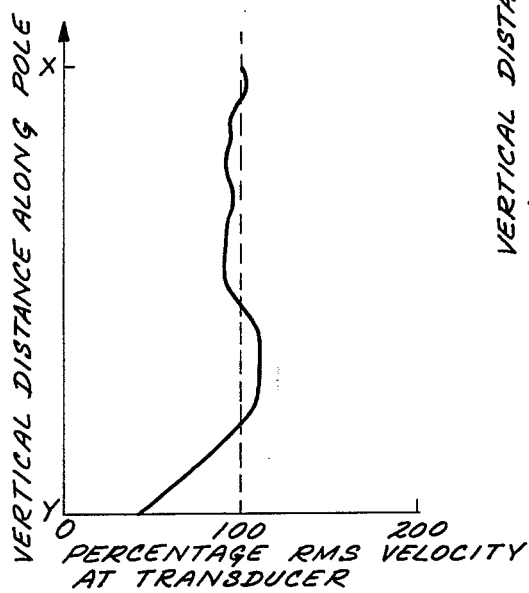
Figure 4:
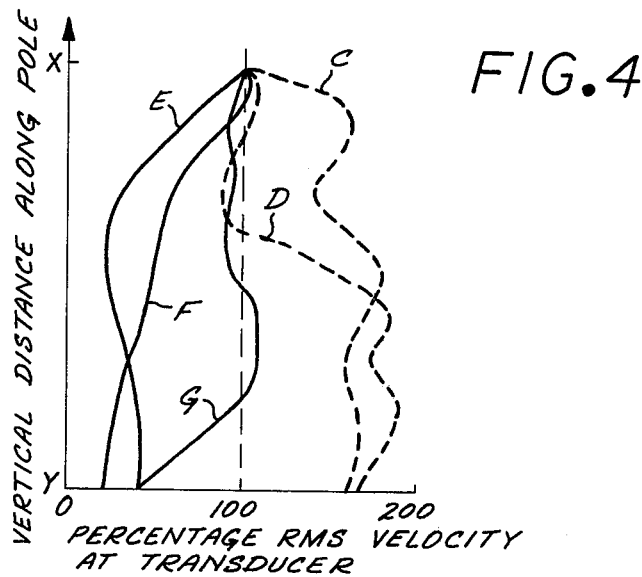
Figure 5:
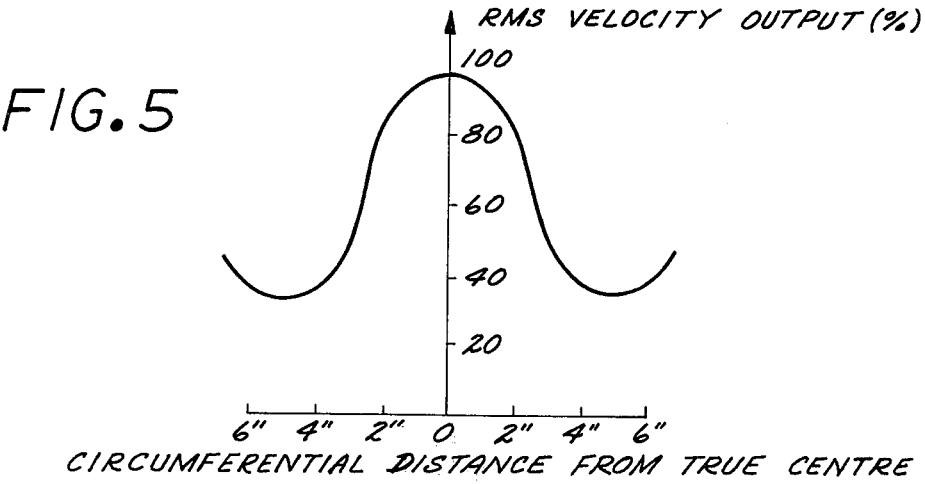
Figure 6:
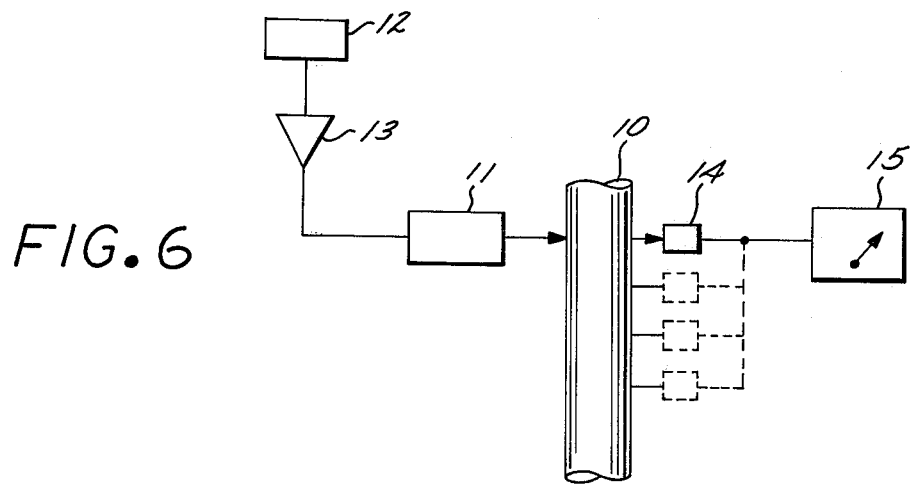
Figure 7:
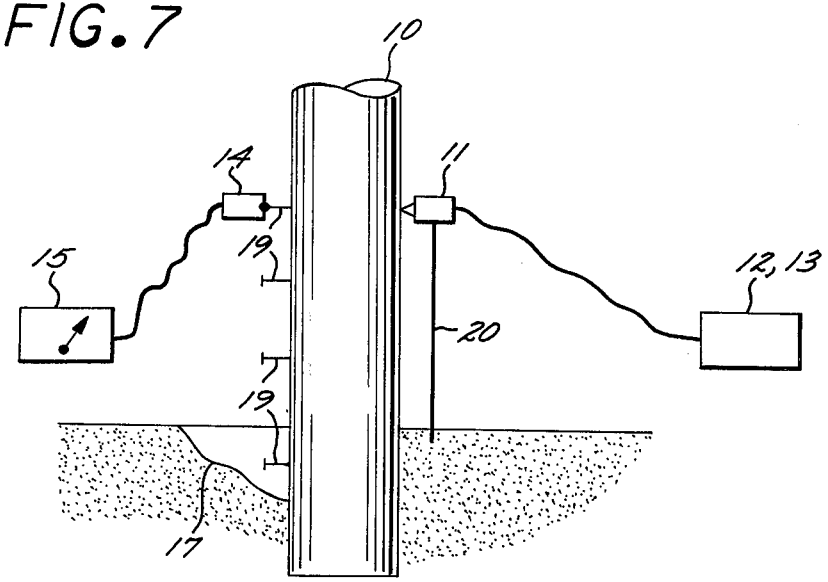

In the drawings:

FIGS. 1 to 4 shown characteristic curves, which are to be hereinafter described and which are derived from the method of testing proposed herein, FIG. 5 is a curve showing emergent energy distribution about the circumference of a pole, FIG. 6 is a schematic representation of an apparatus for use in performing the invention, and FIG. 7 shows (in representative form) application of the apparatus of FIG. 6 to an actual decay detection operation.

As abovementioned, characteristic curves have been derived which indicate the quality of a wooden pole (in terms of the presence or absence or internal decay) and such curves are plotted as energy level of emergent vibrations against a measured length of pole subject of a test.

FIG. 1 illustrates such a plot, it showing an energy level variation curve in terms of R.M.S. velocity against a vertical length of pole over which the energy level measurements were taken. The curve was derived by applying a mechanical vibration force to a point on the circumference of a known good quality, crack-free pole (at a height X from the base of the pole) and by successively measuring the energy level of emergent vibrations at various points between the position X and the base level y of the pole.

The emergent energy levels were measured at points which lie in an axially extending line which is diametrically opposite that point at which the vibrational force was applied.

As shown, the energy level of vibrations which emerge at position X on the length of the pole is taken to be a level of 100 percent and it can be seen that energy level measurements at lower points yield a value of less than 100 percent.

Figure 2:
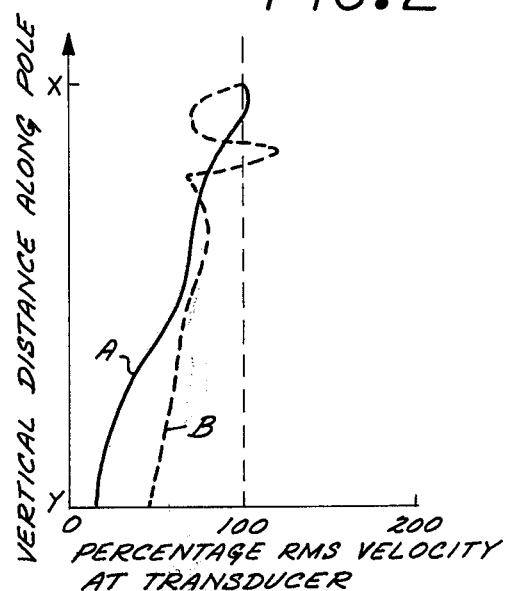

FIG. 2 of the drawings shows two energy variation curves which were derived from subjecting a new (non-decayed) but cracked pole to the above described test. However in this case, one curve (curve A) was derived by applying a vibrational force having a resonant-like characteristic (as hereinbefore defined), while the other curve (curve B) was derived by applying a vibrational force of an arbitrarily selected frequency.

It can be seen that curve A corresponds with the characteristic curve of FIG. 1, whereas curve B does not; this illustrating the need to employ a vibrational force having a resonant frequency when cracked poles might be encountered.

FIG. 3 shows a further characteristic curve which has been derived by applying the above described test procedure to a good quality, aged and cracked pole; the applied vibrational force having a resonant frequency.

In considering each of the above referenced characteristic curves it will be seen that in no case is there any significant increase in the energy level of the emergent vibrations over the tested length of the poles. In each case the average energy level of emergent vibrations tends to be less than the chosen optimum level of 100%.

This is to be contrasted with the curves C and D shown in FIG. 4, such curves having been derived by applying the above described test to two poor quality (decayed) poles. The curves C and D each show an average energy level of emergent vibrations which is greater than the optimum level of 100% whereas curves E, F and G in the same Figure show a relatively negative value. Curves E and F are characteristic of good quality (uncracked) poles and curve G is characteristic of a good quality, aged and cracked pole.

The difference between curves C and D on the one hand and curves E, F and G on the other may be explained (with the benefit of hind sight) in terms of vibration theory. Decay induced rot manifests itself as a material of lower density than good quality wood. The less dense material presents a lower impedance and, for a given resonant-like in-put signal, emergent energy (expressed in terms of velocity) is higher than that passing through uniformly good wood.

Thus, as hereinbefore stated, the quality of a pole may be determined by comparing the emergent energy level differential between the point of application of the energy and axially spaced points of emergent energy measurement. A significant increase in the energy level between the points of application and measurement would indicate the existence of a poor quality pole.

In the interest of avoiding inaccurate readings it is important that the points chosen for measurement of emergent energy should lie on a line which is approximately diametrically disposed with reference to the point of application of the vibratory force. FIG. 5 shows an (emergent) energy distribution curve about the circumference of a pole and it can be seen that a low energy level reading would be obtained if the emergent energy level was measured at a point significantly removed from the diametral line of the pole.

A preferred form of apparatus for use in applying the above described test is shown in FIGS. 6 and 7 and in operative relationship to a pole 10 under test.

The apparatus comprises an electro-magnetic vibrator or hammer 11 which is employed to deliver a vibrational force to the pole. The vibrator is driven from a variable frequency square-wave oscillator 12 which is located in circuit with an amplifier 13. A piezo-electric transducer 14 is employed to receive and detect emergent energy levels (in terms of R.M.S. velocity) and the output of the transducer is delivered to a vibration level detection meter which registers R.M.S. values of velocity.

A description is now given of a typical operation of the apparatus in relation to an electrical conductor support pole which has its lower end embedded in the ground. It is assumed that any decay present in the pole would be at or near ground level and that good quality wood would be present at or above a height of, said, 50 centimeters.

1. Soil at the base of the pole is excavated as at 17 to a depth of about 20 centimeters.
2. Metal spikes 19 having a length of about 8 centimeters are driven into the pole for a depth of 1.5 centimeters at spaced intervals along an axial length of the pole, one spike being located 15 centimeters below ground level and another three spikes being spaced 30 centimeters apart from each other to a height of about 75 centimeters above ground level.
3. The vibrator 11 is supported upon a post 20 and pressed into firm engagement with a circumferential portion of the pole diametrically opposite the upper spike 19
4. The receiver transducer 14 is positively attached to the upper spike 19, opposite the vibrator 11
5. The oscillator 12 is switched-on, thereby causing vibrational energy to the pole.
6. The frequency of the vibrator is adjusted so as to obtain a maximum read-out of the meter 15 for a signal of given amplitude. By doing a so-called resonant frequency for the specific pole is determined and is thereafter used for that pole.
7. Thereafter, the power output of the oscillator is adjusted so as to center an indicator needle of the meter 15 in the meter scale. This reading is then "taken" to be an optimum reading which represents an R.M.S. velocity of vibration of 100 percent.
8. The receiver transducer is then moved to successively lower nails and a reading is taken of the meter read-out. If the meter provides a read-out in excess of 150 percent R.M.S. velocity at any one of the lower spikes it can be taken that decay is present in a dangerous level.

The apparatus should not be used on a pole having an external material which will not solidly support the spikes 19 and if any loose and/or rotten sapwood is present it should be removed before conducting a test.

Although the invention has been described above with specific reference to decay measurement at ground level it will be appreciated that, in application, the invention need not be so limited. Also, the invention need not be limited to use on poles having a circular cross-section nor in respect of poles which have one end embedded in the ground. The invention is appropriate to the detection of decay in any pole-like wooden structure, including wooden piers, supports, and trees.

I claim:

1. A method of detecting the presence of decay in a wooden pole, the method comprising the steps of:
   exciting said pole by a source of mechanical vibration at frequencies falling within the sonic frequency range, said source of mechanical vibration being applied at a selected peripheral one point along the length of said pole;
   measuring emergent energy transmitted through said pole at a number of selected longitudinally spaced other points along the length of the pole, including at a point substantially opposed to said one point of application of said vibrations;
   comparing the relative emergent energy levels at the respective said other points; and
   detecting for a predetermined relative increase in the level of emergent energy at selected ones of the longitudinally spaced said other points, such an increase in emergent energy level being an indication of the presence of decay within the pole.

2. A method as claimed in claim 1 wherein said spaced other points are located along a peripherally axial line which is diametrically opposed to said one point.

3. A method as claimed in claim 1 wherein the emergent energy levels at said respective axially spaced other points is measured by a transducer which provides an output signal representative of the R.M.S. velocity or the acceleration of mechanical vibrations occuring at said other points, said transducer being connected in circuit with a read-out device.

4. A method as claimed in claim 3 wherein said transducer comprises a piezo-electric device.

5. A method as claimed in claim 3 wherein a single said transducer is applied in succession to each of said axially spaced other points.

6. A method as claimed in claim 3 wherein a said transducer is applied to each of said axially spaced outer points, each transducer being selectively connected in circuit with said read-out device by a switching mechanism.

7. A method as claimed in claim 2 wherein said mechanical vibrations are applied by way of an electromagnetic vibrator.

8. A method as claimed in claim 7 wherein said vibrator is energised by a signal delivered by a square-wave oscillator.

* * * * *